(12) United States Patent
Farrelly et al.

(10) Patent No.: US 8,607,992 B2
(45) Date of Patent: Dec. 17, 2013

(54) CERAMIC FILTER

(75) Inventors: Patrick Farrelly, Dundalk (IE); Sean McCormack, Newbridge (IE); Robert Verkerk, Dundalk (IE); David Maybin, Scarva (IE)

(73) Assignee: Aqua-Nu Filtration, Dundalk (IE)

( * ) Notice: Subject to any disclaimer, the term of this patent is extended or adjusted under 35 U.S.C. 154(b) by 78 days.

(21) Appl. No.: 12/333,812

(22) Filed: Dec. 12, 2008

(65) Prior Publication Data

US 2009/0178971 A1 Jul. 16, 2009

(30) Foreign Application Priority Data

Jun. 14, 2006 (IE) .................................. S2006/0450
Jun. 13, 2007 (WO) ................. PCT/EP2007/005213

(51) Int. Cl.
*B01D 24/00* (2006.01)
*B29C 65/00* (2006.01)

(52) U.S. Cl.
USPC .................. 210/510.1; 210/800; 210/500.26; 210/500.27; 210/502.1; 264/44; 264/414; 264/426; 264/434

(58) Field of Classification Search
None
See application file for complete search history.

(56) References Cited

U.S. PATENT DOCUMENTS

| | | | | |
|---|---|---|---|---|
| 2,177,197 A | * | 10/1939 | Cummins | 424/618 |
| 2,386,633 A | * | 10/1945 | Rigterink | 501/134 |
| 4,350,595 A | * | 9/1982 | Gunkel | 210/656 |
| 5,164,085 A | * | 11/1992 | Spokoiny et al. | 210/256 |
| 5,665,234 A | | 9/1997 | Dilenge et al. | |
| 5,776,353 A | | 7/1998 | Palm et al. | |
| 6,030,632 A | * | 2/2000 | Sawan et al. | 424/405 |
| 2003/0151152 A1 | * | 8/2003 | Nichelson et al. | 264/29.1 |

FOREIGN PATENT DOCUMENTS

| | | |
|---|---|---|
| EP | 0 790 070 A1 | 8/1997 |
| GB | 1 191 761 A | 5/1970 |
| GB | 1191761 | 5/1970 |
| JP | 10024205 | 1/1998 |
| JP | 11009989 | 1/1999 |
| KR | 940 006 435 B1 | 7/1994 |
| KR | 2002075156 A | * 10/2002 |

OTHER PUBLICATIONS

Bayer MaterialScience, Sodium Carbosymethyl Cellulose—Supplier Data by Woff Cellulosics a Division of Bayer MaterialScience, Apr. 5, 2005, pp. 1-6.*
"Carboxymethylcellulose" Digital Ceramics Technical Articles, Binders for Ceramic Bodies, 2003.*
2010, Sigma-Aldrich, technical disclosure.*
Database WPI Week 199617, Derwent Publications Ltd., London, GB, AN 1996-169707, XP002449531.
International Search Report for PCT/EP2007/005213 dated Sep. 6, 2007.
Japanese Office Action issued Apr. 24, 2012, in corresponding Japanese application No. 2009-514700 with English translation; 6 pages total.

* cited by examiner

*Primary Examiner* — Krishnan S Menon
*Assistant Examiner* — Allison M Gionta Fitzsimmon
(74) *Attorney, Agent, or Firm* — Additon, Higgins, Pendleton & Ashe, P.A.

(57) ABSTRACT

A ceramic filter comprising: (a) from about 75% to about 95% by weight of diatomaceous earth; (b) from about 10% to about 20% by weight of a flux; and (c) from about 0.03% to about 0.4% by weight of a metallic compound; the percentages by weight being percentages by weight of the ceramic filter.

43 Claims, No Drawings

CERAMIC FILTER

CROSS-REFERENCE TO PRIORITY APPLICATION(S)

This application is a continuation of the commonly assigned Irish Patent Application Serial No. S2006/0450 (filed Jun. 14, 2006, in the Irish Patent Office), and the commonly assigned International Patent Application No. PCT/EP2007/005214 (filed Jun. 13, 2007, in the European Patent Office), both of which are hereby incorporated by reference in their entirety.

FIELD OF THE INVENTION

The present invention relates to a ceramic filter. In particular, it relates to a ceramic filter for filtering liquid, especially tap water so as to remove pathogens or contaminants therefrom.

BACKGROUND

Due to the variable quality of many putative drinking water sources (e.g. public utility or group water supply scheme, well water), in general, such water is unpalatable for drinking, and in certain extreme cases may contain pathogens or contaminants, which can lead to serious illness. For example, some drinking water sources may contain harmful protozoa or bacteria such as *Cryptosporidium*, *Giardia* and *E. Coli*, which can cause illness upon consumption. Thus, there is an increased tendency for water for drinking purposes to be purchased in bottles or other suitable containers, and the purchase of such water can be quite expensive. For example, in the case of athletes who require a regular intake of large volumes of water when training, expenditure on bottled water can be particularly high.

The use of ceramics as a medium in filters is known, including filters for purifying liquid such as tap water. However, such ceramic filters vary in quality, are normally bulky and relatively non-portable, and cannot necessarily be relied on to remove pathogens, such as protozoa from the water. There is therefore a need for a filter which overcomes this problem.

SUMMARY OF THE INVENTION

The present invention is directed towards providing a ceramic filter which is capable of removing contaminants including but not limited to harmful protozoa such as *Cryptosporidium* and *Giardia*, as well as bacteria and viruses, from liquid such as tap water. The ceramic filter of the present invention has many potential applications. For example, it may be used for purifying mains tap water contained in a container, such as a bottle, as it is being drawn from the container.

DETAILED DESCRIPTION

According to a first aspect of the invention, there is provided a ceramic filter comprising:
(a) from about 75% to about 95% by weight of diatomaceous earth;
(b) from about 10% to about 20% by weight of a flux; and
(c) from about 0.03% to about 0.4% by weight of a metallic compound;
the percentages by weight being percentages by weight of the ceramic filter.

As used herein, the term "flux" is intended to mean a vitrifying agent which reduces the melting temperatures of the ingredients and induces ceramic bonding.

Suitable metallic compounds for use in the invention include Group VI-XII metallic compounds, excluding silver. Such metallic compounds may be selected from chromium, manganese, cobalt, nickel, copper and zinc, and in one example selected from copper and zinc. In another example copper is selected. The metallic compound is preferably present in the filter in an amount of from about 0.05% to about 0.3% by weight of the ceramic filter (e.g., from 0.1% to about 0.25%; from about 0.13% to about 0.23%; or about 0.18% by weight of the ceramic filter).

The ceramic filter is conveniently capable of removing material having a size of 1.5 µm or greater in diameter.

The ceramic filter of the invention may have a compression ratio of from about 0.30 to about 0.55 (e.g, from about 0.35 to about 0.50; from about 0.37 to about 0.45; or 0.40. As used herein, the term "compression ratio" is intended to mean the ratio of the thickness of the ceramic filter in millimetres after firing to the thickness of the ceramic filter in millimetres (mm) before firing, wherein the ceramic filter has had a weight applied of approximately 0.08 kg/cm² applied thereto during firing.

The ceramic filter of the invention may have a thickness of from about 2.0 mm to about 4.5 mm (e.g., from about 2.5 mm to about 4.0 mm; or approximately 3.2 mm).

The diatomaceous earth may have a silica content of at least 70%. A diatomaceous earth comprising silica, sodium, magnesium and ferrite is preferred. A diatomaceous earth sold under the trade name Celatom and comprising at least 70% silica, from about 4% to about 8% sodium, from about 2% to about 4% magnesium and from about 1.5% to 2.5% ferrite. The diatomaceous earth may be a diatomaceous earth sold under the trade name Celatom FW, the trade name Celatom FW-12 (having an average particle diameter of about 24 µm and capable of removing material having a particle size of about 0.7 µm), FW-14 (having an average particle diameter of about 28 µm and capable of removing material having a particle size of about 0.75 µm), FW-18 (having an average particle diameter of about 31 µm and capable of removing material having a particle size of about 0.8 µm), FW-20 (having an average particle diameter of about 33 µm and capable of removing material having a particle size of about 0.9 µm), FW-40 (having an average particle diameter of about 40 µm and capable of removing material having a particle size of about 1.0 µm), FW-50 (having an average particle diameter of about 42 µm and capable of removing material having a particle size of about 1.1 µm), FW-60 (having an average particle diameter of about 48 µm and capable of removing material having a particle size of about 1.2 µm), or FW-80 (having an average particle diameter of about 77 µm and capable of removing material having a particle size of about 1.6 µm), or mixtures thereof.

The diatomaceous earth may comprise a mixture of two or more diatomaceous earths of different particle diameter, for example a mixture of a diatomaceous earth having an average particle diameter of from about 25 µm to about 30 µm with one having an average particle diameter of from about 75 µm to about 80 µm. A mixture of a diatomaceous earth having an average particle diameter of about 28 µm with one having an average particle diameter of from about 77 µm is preferred. When a mixture of two diatomaceous earths is used, the diatomaceous earth may be capable of filtering matter having a particle size of from about 0.5 µm to about 3.0 µm (e.g., from about 1.0 µm to about 2.5 µm; or from about 1.5 µm to about 2.0 µm). A mixture of diatomaceous earths sold under the trade names Celatom FW-14 and FW-80 may be used in a mixture in a ratio of from about 30:70 to about 70:30 by weight of the diatomaceous earth (e.g., from about 60:40 to about 40:60; or about 50:50 by weight of the diatomaceous earth).

The diatomaceous earth may be present in an amount of from about 80% to about 90% by weight of the ceramic filter (e.g., from about 81% to about 87%; from about 83% to about 85%; or about 84% by weight of the ceramic filter).

The flux acts to bind the constituents, namely, the diatomaceous earth and metallic compound during the firing process in the manufacture of the filter, and gives additional strength to the finished ceramic filter. Suitable fluxes for use in the invention include barium carbonate ($BaCO_3$), barium ($BaSO_4$), calcite ($CaCO_3$), chalk ($CaCO_3$), cornish stone (variable), dolomite ($CaCO_3.MgCO_3$), feldspar (potash) ($K_2O.Al_2O_3.6SiO_2$), feldspar (soda) ($Na_2O.Al_2O_3.6SiO_2$), lepidolite ($Li_2F_2.Al_2O_3.3SiO_2$), limestone ($CaCO_3$), lithium carbonate ($Li_2CO_3$), magnesium carbonate ($MgCO_3$), magnesium carbonate (light) $3MgCO_3.Mg(OH)_2 3H_2O$, manganese carbonate ($MnCO_3$), manganese dioxide ($MnO_2$), nepheline syenite ($(K)NaO.Al_2O_3.4SiO_2$) (approx)), petalite ($Li_2O.Al_2O_3.8SiO_2$), potassium carbonate (pearl ash) ($K_2CO_3$), rock powder e.g. basalt or granite, sodium carbonate (soda ash) ($Na_2CO_3$), spodumene ($Li_2O.Al_2O_3.4SiO_2$), strontium carbonate ($SrCO_3$), talc ($3MgO.4SiO_2.H_2O$), whiting ($CaCO_3$), wollastonite ($CaO.SiO_2$), wood ash (may contain solubles) (variable, (often high in lime)), zinc oxide (ZnO), and boron-containing compounds.

Boron-containing compounds may be provided, and in one example the boron-containing compounds are oxides of boron, salts of boron and hydrates of the salts. Suitable salts include alkali metal salts of boron or of boric acid. Sodium borate, also known as sodium tetraborate decahydrate, disodium tetraborate, borax decahydrate or borax ($Na_2B_4O_7.10H_2O$) are used in one example.

Suitable oxides of boron include colemanite ($2CaO.3B_2O_3.5H_2O$ (variable)), gerstley borate (mixture of colemanite [$Ca_2B_6O_{11}.5H_2O$] and ulexite [$NaO.2CaO.5B_2O_3.5H_2O$]) and boron oxide having the formula $B_2O_3$. Boron oxide having the formula $B_2O_3$ may be provided, optionally in its amorphous form. A flux comprising boron oxide ($B_2O_3$), aluminium oxide ($Al_2O_3$) and/or silica ($SiO_2$) may be used. For example, a flux comprising from about 10% to about 30% of boron oxide (e.g., about 20% of boron oxide); from about 2% to about 15% of aluminium oxide (e.g., about 8% of aluminium oxide); and from about 40% to about 60% of silica (e.g., about 50% of silica). In one example, a frit comprising boron is used, especially a frit comprising an oxide of boron. A frit comprising boron oxide ($B_2O_3$), aluminium oxide ($Al_2O_3$) and/or silica ($SiO_2$) may be used. In one example, the invention provides a boron frit comprising from about 10% to about 30% of boron oxide (e.g., about 20% of boron oxide); from about 2% to about 15% of aluminium oxide (e.g., about 8% of aluminium oxide); and from about 40% to about 60% of silica (e.g., about 50% of silica).

The flux may have a firing temperature from about 300° C. to about 1500° C. (e.g., from about 400° C. to about 1300° C.; or from about 500° C. to about 1200° C.). In another example, the flux has a firing temperature of approximately 1050° C. In yet another example, the invention incorporates a boron frit having a firing temperature of approximately 1085° C.

The flux may be present in an amount of from about 12% to about 18% by weight of the ceramic filter (e.g., from about 14% to about 16%; or about 15% by weight of the ceramic filter). In one example, a boron frit present in an amount of about 15% is used.

According to a second aspect of the present invention, there is provided a composition for forming a ceramic filter according to the invention, the composition comprising:

(a) from about 10% to about 30% by weight of diatomaceous earth;

(b) from about 1% to about 6% by weight of a flux;

(c) from about 0.05% to about 1.0% by weight of a metallic compound or a salt thereof or a hydrate of the salt;

(d) from about 0.5% to about 6% by weight of a cellulose gum; and (e) from about 2% to about 10% by weight of a bulking agent; and (f) from about 50% to about 85% by weight of water;

the percentages by weight being percentages by weight of the total composition.

The metallic compound may be a metallic compound as defined above for the ceramic filter and may be present in the composition in the form of a salt or a hydrate of the salt. The salt may be selected from sulphate, carbonate, chloride and acetate, and in one example sulphate. In one example, copper sulphate or a hydrate thereof is used (e.g., copper sulphate pentahydrate).

The metallic compound or salt thereof or hydrate of the salt may be present in the composition in an amount of from about 0.07% to about 0.8% by weight of the total composition (e.g., from 0.1% to about 0.5%; from about 0.15% to about 0.3%; or about 0.2% by weight of the total composition).

The diatomaceous earth is as defined above for the ceramic filter and may be present in the composition in an amount of from about 14% to about 26% by weight of the total composition (e.g., about 16% to about 24%; about 18% to about 22%; or about 20% by weight of the total composition).

The flux is as defined above for the ceramic filter and may be present in the composition in an amount of from about from about 2% to about 5% by weight of the total composition (e.g., from about 2.5% to about 4.5%; from about 3% to about 4%; or about 3.8% by weight of the total composition).

The cellulose gum in the composition acts to produce a malleable composition.

Suitable cellulose gums include methyl cellulose, carboxymethylcellulose, hydroxymethylcellulose, hydroxypropylcellulose, hydroxypropylmethylcellulose, and mixtures thereof. Carboxymethylcellulose is preferred. A modified cellulose gum is particularly preferred, preferably a modified carboxymethylcellulose, especially sodium carboxymethylcellulose. Sodium carboxymethylcellulose sold under the trade name Blanose available from Hercules S. A., Alizay, France, is particularly preferred. The cellulose gum is preferably present in an amount of from about 1% to about 5% by weight of the total composition (e.g., from about 1.5% to about 4%; about 2% to about 3%; or about 2.3% by weight of the total composition). In one example, sodium carboxymethylcellulose in an amount of about 2.3% is used.

Bulking agents which can be used in the composition include hemp, cotton, flax, silk, wool, cellulose and mixtures thereof. Cellulose is used in one example. The bulking agent may be present in an amount of from about 3% to about 7% by weight of the total composition (e.g.; from about 3.5% to about 6%; from about 4% to about 5%; or about 4.3% by weight of the total composition). Cellulose present in an amount of about 4.3% is used in one example. The bulking agent is burnt off during the firing process in the manufacture of the ceramic filter, leaving a honeycomb structure within the ceramic. Cellulose is typically burnt off at a temperature of about 300° C.

The water may be present in an amount of from about 55% to about 80% by weight of the total composition (e.g., from about 60% to about 75%; from about 65% to about 70%; or about 68% by weight of the total composition).

According to a third aspect of the present invention, there is provided a precursor filter for forming a ceramic filter according to the invention, the precursor filter comprising:
  (a) from about 50% to about 98% by weight of diatomaceous earth;
  (b) from about 2% to about 20% by weight of a flux;
  (c) from about 0.1% to about 1.5% by weight of a metallic compound or a salt thereof or a hydrate of the salt;
  (d) from about 2% to about 20% by weight of a cellulose gum; and
  (e) from about 5% to about 35% by weight of a bulking agent;
  the percentages by weight being percentages by weight of the total precursor filter.

The metallic compound or a salt thereof or a hydrate of the salt, the diatomaceous earth, the flux, the cellulose gum and the bulking agent present in the precursor filter are each as defined above for the composition.

The metallic compound or salt thereof or hydrate of the salt may be present in an amount of from about 0.2% to about 1.2% by weight of the total precursor filter (e.g., from 0.3% to about 1.0%; from about 0.4% to about 0.8%; or about 0.5% by weight of the total precursor filter).

The diatomaceous earth is preferably present in an amount of from about 55% to about 90% by weight of the total precursor filter (e.g., from about 60% to about 85%; from about 62% to about 80%; or about 65% by weight of the total precursor filter).

The flux may be present in an amount of from about 5% to about 15% by weight of the total precursor filter (e.g., from about 8% to about 14%; or about 12% by weight of the total precursor filter).

The cellulose gum is preferably present in an amount of from about 4% to about 15% by weight of the total precursor filter (e.g., from about 5% to about 10%; or about 8% by weight of the total precursor filter).

The bulking agent is preferably present in an amount of from about 8% to about 30% by weight of the total precursor filter (e.g., from about 10% to about 25%; or approximately 13% by weight of the total precursor filter).

According to the invention, there is also provided a method for preparing a ceramic filter according to the invention, the method comprising the steps of:
  (A) forming a composition according to the invention by combining the following ingredients:
    (a) from about 10% to about 30% by weight of diatomaceous earth;
    (b) from about 1% to about 6% by weight of a flux;
    (c) from about 0.05% to about 1.0% by weight of a metallic compound or a salt thereof or a hydrate of the salt;
    (d) from about 0.5% to about 6% by weight of a cellulose gum; and
    (e) from about 2% to about 10% by weight of a bulking agent; and
    (f) from about 50% to about 85% by weight of water;
    the percentages by weight being percentages by weight of the total composition;
  (B) removing a portion of water from the composition to as to form a composition having a shaping consistency;
  (C) drying the composition so as to remove any residual water to form a precursor filter according to the invention; and
  (D) firing the precursor filter to form the ceramic filter.

In step (A), the ingredients may be combined at a temperature of from about 20° C. to about 40° C., and in one example about 30° C.

In step (A), the ingredients of the composition are preferably combined in the following order of addition:
  (i) add the metallic compound or salt thereof or hydrate of the salt to water;
  (ii) add the cellulose gum to the resulting mixture;
  (iii) add the flux to the resulting mixture;
  (iv) add the bulking agent to the resulting mixture; and
  (v) add diatomaceous earth to the resulting mixture.

In step (B), the composition is may be allowed to rest for from about 30 minutes to about 5 hours (e.g., from about 1 hour to about 3 hours; or about 2 hours) at a temperature of from about 20° C. to about 40° C. (e.g., about 30° C.). The shaping consistency of the composition conveniently allows it to be cut into desired shapes.

Following step (B) and prior to step (C), the composition may be cut into desired shapes. The desired shapes may take any suitable form, but may be substantially circular discs (e.g., discs having a diameter of about 20 mm to about 25 mm; or approximately 22 mm).

Step (C) comprises heating for a period of time of about 30 minutes to about 2 hours (e.g., about 1 hour) at a temperature of from about 90° C. to about 110° C. (e.g., about 100° C.).

In step (D), the firing is preferably carried out at a temperature of from about 800° C. to about 1200° C. (e.g., from about 900° C. to about 1150° C.; from about 1000° C. to about 1100° C.; or about 1085° C.). The precursor filters may be fired for a period of from about 4 hours to about 11 hours (e.g., from about 6 hours to about 9 hours; or about 8.25 hours).

The method conveniently comprises applying a load to the precursor filters in order to cause compression thereof during firing (step (D)). The load may be from about 0.05 kg/cm$^2$ to about 0.1 kg/cm$^2$ (e.g., about 0.08 kg/cm$^2$).

Advantages of the ceramic filters of the invention include the following:

They remove all or substantially all of protozoa, including *Cryptosporidium* and *Giardia* from tap water.

When the metallic compound in the filter is copper, it conveniently acts as an anti-bacterial agent.

They have both excellent filtration properties and anti-bacterial properties.

The following examples serve to illustrate the invention but it will be appreciated that the invention is not limited to these examples.

Example 1

A ceramic filter was prepared from the ingredients listed in Table 1, and prepared according to the steps in Table 2:

TABLE 1

| Ingredients | Weight % (based on ceramic filter) |
| --- | --- |
| Water | 68.6 |
| Copper sulphate pentahydrate | 0.2 |
| Blanose[1] | 2.6 |

TABLE 1-continued

| Ingredients | Weight % (based on ceramic filter) |
|---|---|
| Boron frit[2] | 3.8 |
| Cellulose | 4.3 |
| Diatomaceous earth[3] | 20.6 |
| Total | 100.0 |

[1]sodium carboxymethylcellulose;
[2]7.5% $Al_2O_3$, 18.0% $B_2O_3$, 50.0% $SiO_2$, 14.0% CaO + MgO, 10.3% $Li_2O$ + $Na_2O$ + $K_2O$, available from Johnson Mathey Ceramics, Stoke-on-Trent, United Kingdom;
[3]50:50 mixture of diatomaceous earths sold under the trade names Celatom FW-14 and FW-80.

TABLE 2

| Step | |
|---|---|
| 1 | Use 400 g of water (at 30° C., ±10) |
| 2 | Add 1 g copper sulphate pentahydrate |
| 3 | Blend in copper for 20 seconds |
| 4 | Add 15 g Blanose, food grade |
| 5 | Blend mixture for 60 seconds |
| 6 | Add 22 g boron frit |
| 7 | Blend mixture for 30 seconds |
| 8 | Add 25 g cellulose |
| 9 | Blend mixture for 100 to 140 seconds |
| 10 | Add 120 g diatomaceous earth |
| 11 | Blend mixture for 180 seconds |
| 12 | Pour onto plaster bat (slab) to form the composition |
| 13 | Leave mixture until suitable for shaping (>2 hours), which results in the composition having a shaping consistency |
| 14 | Place mixture onto flat surface and roll to flat shape of thickness of approximately 6 mm |
| 15 | Use cutter to produce 9 circular discs of required sizes (approximately 22 mm diameter) |
| 16 | Place discs into oven at 100° C. and remove when discs have dried out sufficiently to allow compression during firing process, to form precursor filters |
| 17 | Place discs, evenly spaced, onto clay tile (150 mm × 150 mm) and put into kiln |
| 18 | Place load onto discs which equates to a load of 0.08 kg/cm2 to cause compression during firing process |
| 19 | Program temperature settings on kiln as indicated below:<br>(i) 0° C. to 300° C., rising at 100° C. per hour (total 180 mins);<br>(ii) 300 to 1085° C., rising at 150° C. per hour (total 314 mins);<br>(iii) falls naturally after 1085° C. is reached. |
| 20 | Allow temperature of discs to fall to <700° C. below which discs are durable enough to withstand normal handling during removal from kiln, to form ceramic filters. |

Example 2

A precursor filter produced obtained in step 16 of Table 2 in Example 1 was analysed and the results are shown in Table 3:

TABLE 3

| Ingredients | Weight % (based on the precursor filter) |
|---|---|
| Copper sulphate | 0.5% |
| Blanose[1] | 8.2% |
| Borax frit[2] | 12.0% |

TABLE 3-continued

| Ingredients | Weight % (based on the precursor filter) |
|---|---|
| Cellulose | 13.7% |
| Diatomaceous earth[3] | 65.6% |
| Total | 100% |

[1]sodium carboxymethylcellulose;
[2]7.5% $Al_2O_3$, 18.0% $B_2O_3$, 50.0% $SiO_2$, 14.0% CaO + MgO, 10.3% $Li_2O$ + $Na_2O$ + $K_2O$, available from Johnson Mathey Ceramics, Stoke-on-Trent, United Kingdom;
[3]50:50 mixture of diatomaceous earths sold under the trade names Celatom FW-14 and FW-80.

Example 3

A ceramic filter of the invention obtained in step 20 of Table 2 of Example 1 was analysed and the content shown in Table 4:

TABLE 4

| Ingredients | Weight % (based on the ceramic filter) |
|---|---|
| Elemental Copper | 0.18 |
| Diatomaceous earth[1] | 83.9 |

[1]50:50 mixture of diatomaceous earths sold under the trade names Celatom FW-14 and FW-80.
The ceramic filter also comprises frit and other components.

The ceramic filter also comprises frit and other components.

Example 4

Six ceramic filters obtained in Example 1 and having a typical content as shown in Example 3 were subjected to a filtration test using de-ionised water, spiked with a quantity of 200 *Giardia* cysts and 200 *Cryptosporidium* oocysts. Prior to testing, the thickness and the compression ratios were determined for each filter. 10 litres of the spiked water was allowed to pass through each ceramic filter at a pressure of 10 kPa, flowing at a rate of 1 litre/min. The water was analysed pre-filtration and post-filtration for *Cryptosporidium* and *Giardia* content. The results obtained are shown in Table 5:

TABLE 5

| Ceramic Reference no. | Thickness (mm) | Compression Ratio | Cryptosporidium Removal (%) | Giardia Removal (%) |
|---|---|---|---|---|
| 1 | 3.40 | 0.49 | 94.0% | 95.0% |
| 2 | 3.00 | 0.43 | 98.0% | 99.5% |
| 3 | 3.00 | 0.38 | 90.5% | 100.0% |
| 4 | 2.84 | 0.36 | 90.5% | 100.0% |
| 5 | 3.66 | 0.52 | 97.5% | 100.0% |
| 6 | 3.04 | 0.43 | 98.0% | 100.0% |

The ceramic filters of the present invention were found to remove up to 98% of *Cryptosporidium*, and up to 100% of *Giardia*. The best results were obtained using ceramic filter no. 6 having a thickness of 3.04 mm and a compression ratio of 0.43.

In summary, the ceramic filters of the invention have been shown to have excellent protozoan filtration properties, and may be used in a wide variety of applications.

The invention claimed is:

1. A ceramic filter comprising:
   (a) from about 75% to about 87% by weight of diatomaceous earth;
   (b) from about 10% to about 20% by weight of a flux; and
   (c) from about 0.03% to about 0.4% by weight of a metallic compound, the metallic compound being selected from chromium, manganese, cobalt, nickel, copper and/or zinc;
   the percentages by weight being percentages by weight of the ceramic filter, wherein the ceramic filter has an internal honeycomb structure having a flow rate of spiked water of at least about 1 liter/min at 10 kPa;
   wherein the internal honeycomb structure is obtained by burning off a bulking agent by firing a precursor filter, the precursor filter comprising from about 8% to about 30% by weight of the bulking agent, the bulking agent being selected from hemp, cotton, flax, silk, wool, or cellulose, or a combination thereof.

2. A ceramic filter as claimed in claim 1, wherein the metallic compound is selected from copper and zinc.

3. A ceramic filter as claimed in claim 2, wherein the metallic compound is copper.

4. A ceramic filter as claimed in claim 1, wherein the metallic compound is present in the filter in an amount of from about 0.05% to about 0.3% by weight of the ceramic filter.

5. A ceramic filter as claimed in claim 1, wherein the ceramic filter is capable of removing material having a size of 1.5 µm or greater in diameter.

6. A ceramic filter as claimed in claim 1, having a compression ratio of from about 0.30 to about 0.55.

7. A ceramic filter as claimed in claim 1, having a thickness of from about 2.0 mm to about 4.0 mm.

8. A ceramic filter as claimed in claim 1, wherein the diatomaceous earth comprises at least 70% silica, from about 4% to about 8% sodium, from about 2% to about 4% magnesium and from about 1.5% to 2.5% ferrite.

9. A ceramic filter as claimed in claim 1, wherein the diatomaceous earth is present in an amount of from about 81% to about 87% by weight of the ceramic filter.

10. A ceramic filter as claimed in claim 1, wherein the flux has a firing temperature of from about 300° C. to about 1500° C.

11. A ceramic filter as claimed in claim 1, wherein the flux is present in an amount of from about 12% to about 18% by weight of the ceramic filter.

12. A ceramic filter as claimed in claim 1, wherein cellulose is used as a bulking agent.

13. A ceramic filter as claimed in claim 8, wherein the diatomaceous earth comprises a mixture of diatomaceous earths (a) having an average particle diameter of about 28 µm and (b) having an average particle diameter of about 77 µm, the mixture having a ratio of from about 30:70 to about 70:30 by weight of the diatomaceous earth.

14. A ceramic filter as claimed in claim 1, wherein the flux comprises a compound selected from barium carbonate ($BaCO_3$), barium ($BaSO_4$), calcite ($CaCO_3$), chalk ($CaCO_3$), cornish stone, dolomite ($CaCO_3.MgCO_3$), feldspar (potash) ($K_2O.Al_2O_3.6SiO_2$), feldspar (soda) ($Na_2O.Al_2O_3.6SiO_2$), lepidolite ($Li_2F_2.Al_2O_3.3SiO_2$), limestone ($CaCO_3$), lithium carbonate ($Li_2CO_3$), magnesium carbonate ($MgCO_3$), magnesium carbonate (light) $3MgCO_3.Mg(OH)_2 3H_2O$, manganese carbonate ($MnCO_3$), manganese dioxide ($MnO_2$), nepheline syenite (($K$)$NaO.Al_2O_3.4SiO_2$)), petalite ($Li_2O.Al_2O_3.8SiO_2$), potassium carbonate ($K_2CO_3$), rock powder, sodium carbonate ($Na_2CO_3$), spodumene ($Li_2O.Al_2O3.4SiO_2$), strontium carbonate ($SrCO_3$), talc ($3MgO.4SiO_2.H_2O$), whiting ($CaCO_3$), wollastonite ($CaO.SiO_2$), wood ash), zinc oxide ($ZnO$), or boron-containing compounds, or a combination thereof.

15. A ceramic filter as claimed in claim 14, wherein the flux comprises a boron-containing compound selected from oxides of boron, salts of boron or hydrates of the salts, or a combination thereof.

16. A ceramic filter as claimed in claim 15, wherein the flux comprises an oxide of boron.

17. A ceramic filter as claimed in claim 16, wherein the flux additionally comprises aluminium oxide ($Al_2O_3$) and/or silica ($SiO_2$).

18. A ceramic filter as claimed in claim 17, wherein the flux comprises from about 10% to about 30% of boron oxide; from about 2% to about 15% of aluminium oxide, and from about 40% to about 60% of silica.

19. A ceramic filter as claimed in claim 14, wherein the flux is in the form of a frit.

20. A ceramic filter comprising:
   (a) from about 81% to about 87% by weight of diatomaceous earth;
   (b) from about 10% to about 20% by weight of a flux, the flux comprising a boron-containing compound selected from oxides of boron, salts of boron or hydrates of the salts, or a combination thereof; and
   (c) from about 0.03% to about 0.4% by weight of a metallic compound, the metallic compound being selected from chromium, manganese, cobalt, nickel, copper and/or zinc;
   the percentages by weight being percentages by weight of the ceramic filter, wherein the ceramic filter has an internal honeycomb structure sufficient to provide a flow rate of spiked water of at least about 1 liter/min at 10 kPa wherein the internal honeycomb structure is obtained by burning off a bulking agent by firing a precursor filter, the precursor filter comprising from about 8% to about 30% by weight of the bulking agent, the bulking agent being selected from hemp, cotton, flax, silk, wool, or cellulose, or a combination thereof.

21. A ceramic filter as claimed in claim 20, wherein the metallic compound is selected from copper and zinc.

22. A ceramic filter as claimed in claim 20, wherein the metallic compound is copper.

23. A ceramic filter as claimed in claim 20, wherein the metallic compound is present in the filter in an amount of from about 0.05% to about 0.3% by weight of the ceramic filter.

24. A ceramic filter as claimed in claim 20, wherein the ceramic filter is capable of removing material having a size of 1.5 µm or greater in diameter.

25. A ceramic filter as claimed in claim 20, having a compression ratio of from about 0.30 to about 0.55.

26. A ceramic filter as claimed in claim 20, having a thickness of from about 2.0 mm to about 4.0 mm.

27. A ceramic filter as claimed in claim 1, wherein the diatomaceous earth comprises at least 70% silica, from about 4% to about 8% sodium, from about 2% to about 4% magnesium and from about 1.5% to 2.5% ferrite.

28. A ceramic filter as claimed in claim 27, wherein the diatomaceous earth comprises a mixture of diatomaceous earths (a) having an average particle diameter of about 28 µm and (b) having an average particle diameter of about 77 µm, the mixture having a ratio of from about 30:70 to about 70:30 by weight of the diatomaceous earth.

29. A ceramic filter as claimed in claim 20, wherein the diatomaceous earth is present in an amount of from about 81% to about 87% by weight of the ceramic filter.

30. A ceramic filter as claimed in claim 1, wherein the flux comprises a compound selected from barium carbonate ($BaCO_3$), barium ($BaSO_4$), calcite ($CaCO_3$), chalk ($CaCO_3$), cornish stone, dolomite ($CaCO_3.MgCO_3$), feldspar (potash) ($K_2O.Al_2O_3.6SiO_2$), feldspar (soda) ($Na_2O.Al_2O_3.6SiO_2$), lepidolite ($Li_2F_2.Al_2O_3.3SiO_2$), limestone ($CaCO_3$), lithium carbonate ($Li_2CO_3$), magnesium carbonate ($MgCO_3$), magnesium carbonate (light) $3MgCO_3.Mg(OH)_23H_2O$, manganese carbonate ($MnCO_3$), manganese dioxide ($MnO_2$), nepheline syenite (($K)NaO.Al_2O_3.4SiO_2$)), petalite ($Li_2 0.Al_2O_3.8SiO_2$), potassium carbonate ($K_2CO_3$), rock powder, sodium carbonate ($Na_2CO_3$), spodumene ($Li_2 0.Al_2O3.4SiO_2$), strontium carbonate ($SrCO_3$), talc ($3MgO.4SiO_2.H_2O$), whiting ($CaCO_3$), wollastonite ($CaO.SiO_2$), wood ash), zinc oxide ($ZnO$), or boron-containing compounds, or a combination thereof.

31. A ceramic filter as claimed in claim 30, wherein the flux comprises a boron-containing compound selected from oxides of boron, salts of boron or hydrates of the salts, or a combination thereof.

32. A ceramic filter as claimed in claim 31, wherein the flux comprises an oxide of boron.

33. A ceramic filter as claimed in claim 32, wherein the flux additionally comprises aluminium oxide ($Al_2O_3$) and/or silica ($SiO_2$).

34. A ceramic filter as claimed in claim 33, wherein the flux comprises from about 10% to about 30% of boron oxide; from about 2% to about 15% of aluminium oxide, and from about 40% to about 60% of silica.

35. A ceramic filter as claimed in claim 30, wherein the flux is in the form of a frit.

36. A ceramic filter comprising:
 (a) from about 75% to about 87% by weight of diatomaceous earth;
 (b) from about 10% to about 20% by weight of a flux; and
 (c) from about 0.03% to about 0.4% by weight of a metallic compound;
  wherein the ceramic filter provides a flow rate of spiked water of at least about 1 liter/min at 10 kPa;
  the percentages by weight being percentages by weight of the ceramic filter, wherein the ceramic filter is formed by a method comprising the steps of:
 (A) forming a composition by combining the following ingredients:
  (a) from about 10% to about 30% by weight of diatomaceous earth;
  (b) from about 1% to about 6% by weight of a flux;
  (c) from about 0.05% to about 1.0% by weight of a metallic compound or a salt thereof or a hydrate of the salt;
  (d) from about 0.5% to about 6% by weight of a cellulose gum; and
  (e) from about 2% to about 10% by weight of a bulking agent; and
  (f) from about 50% to about 85% by weight of water;
  the percentages by weight being percentages by weight of the total composition;
 (B) removing a portion of water from the composition to as to form a composition having a shaping consistency;
 (C) drying the composition so as to remove any residual water to form a precursor filter; and
 (D) firing the precursor filter to form the ceramic filter, whereby the bulking agent is burnt off, leaving a honeycomb structure within the ceramic filter.

37. A ceramic filter as claimed in claim 36, wherein the metallic compound comprises chromium, manganese, cobalt, nickel, copper and/or zinc.

38. A ceramic filter as claimed in claim 36, wherein the metallic compound comprises copper and/or zinc.

39. A ceramic filter as claimed in claim 36, wherein the metallic compound comprises copper.

40. A ceramic filter as claimed in claim 36, wherein the step of forming a composition comprises combining from about 3% to about 7% by weight of a bulking agent.

41. A ceramic filter as claimed in claim 36, wherein the bulking agent is present in the precursor filter in an amount from about 8% to about 30% by weight of the total precursor filter.

42. A ceramic filter as claimed in claim 36, wherein the bulking agent comprises hemp, cotton, flax, silk, wool, or cellulose, or a combination thereof.

43. A ceramic filter as claimed in claim 36, wherein the bulking agent comprises cellulose.

\* \* \* \* \*